(12) United States Patent
Swink (10) Patent No.: US 9,738,198 B2
(45) Date of Patent: Aug. 22, 2017

(54) LOAD AND LOCK CONTAINERS FOR CARRYING GOODS IN VEHICLES AND ASSOCIATED METHODS

(71) Applicant: Robert Quinn Swink, Woodleaf, NC (US)

(72) Inventor: Robert Quinn Swink, Woodleaf, NC (US)

( * ) Notice: Subject to any disclaimer, the term of this patent is extended or adjusted under 35 U.S.C. 154(b) by 0 days.

(21) Appl. No.: 14/665,954

(22) Filed: Mar. 23, 2015

(65) Prior Publication Data

US 2016/0280146 A1 Sep. 29, 2016

(51) Int. Cl.
| B60R 7/02 | (2006.01) |
| B60N 3/00 | (2006.01) |
| B60P 7/08 | (2006.01) |
| B60R 13/01 | (2006.01) |
| B65D 25/20 | (2006.01) |
| B60R 11/00 | (2006.01) |

(52) U.S. Cl.
CPC ............ *B60N 3/00* (2013.01); *B60P 7/08* (2013.01); *B60P 7/0884* (2013.01); *B60R 13/01* (2013.01); *B65D 25/20* (2013.01); *B60R 7/02* (2013.01); *B60R 2011/0061* (2013.01)

(58) Field of Classification Search
CPC ............ B60R 7/02; B60R 2011/0036; B60R 2011/0047; B60R 2011/0061; B60R 2011/0073; B60R 2011/0077; B60R 13/01; B60P 7/08; B60P 7/0884; B60N 3/00
USPC ................................................ 224/539, 544
See application file for complete search history.

(56) References Cited

U.S. PATENT DOCUMENTS

| 1,234,730 A | | 7/1917 | Chapman | |
| 2,578,238 A | * | 12/1951 | Goldman | ................. B60R 5/04 206/508 |
| 2,883,764 A | | 4/1959 | Stephens | |
| 3,002,650 A | | 10/1961 | Lovell | |
| 3,131,829 A | * | 5/1964 | Masser | .............. B65D 21/0204 206/144 |
| 3,351,228 A | | 11/1967 | Huisman | |
| 3,374,914 A | | 3/1968 | Adam | |
| 3,616,943 A | | 11/1971 | Brink | |
| D264,014 S | | 4/1982 | Cornou | |
| 4,754,883 A | | 7/1988 | Grzywa | |

(Continued)

*Primary Examiner* — Nathan J Newhouse
*Assistant Examiner* — Scott McNurlen
(74) *Attorney, Agent, or Firm* — Ben Schroeder Law, PLLC (57) ABSTRACT

Containers can be used on moving vehicles such as trucks (like pick-up trucks) that have elements on the outside of those containers that allow the containers to be affixed and/or secured to the moving vehicle. The containers can also be easily removed so that they no longer are affixed and/or secured to the moving vehicle. The inside of the container allows goods to be inserted inside the container so that the goods can be transported without the fear of the container failing over and/or the goods falling out of the container. The containers/totes contain protrusions and/or depressions that allow them to snap fit into correspondingly opposite depressions and/or protrusions on the surface of a vehicle or the surface of an optionally present intermediary layer. If an intermediary layer is present, the intermediary layer can be affixed to and or secured to a surface on a vehicle.

8 Claims, 5 Drawing Sheets

(56) References Cited

U.S. PATENT DOCUMENTS

| | | | | |
|---|---|---|---|---|
| 4,838,745 A | * | 6/1989 | Haydock | B60R 7/02 224/42.32 |
| 4,941,784 A | * | 7/1990 | Flament | B60R 7/02 211/184 |
| 5,025,964 A | | 6/1991 | Phirippidis | |
| D333,094 S | * | 2/1993 | Zutler | D9/423 |
| 5,392,945 A | * | 2/1995 | Syrek | A63H 33/08 206/508 |
| 5,469,999 A | | 11/1995 | Phirippidis | |
| 5,538,153 A | | 7/1996 | Marovskis et al. | |
| 5,671,511 A | * | 9/1997 | Hattori | A44B 18/0065 24/442 |
| 5,676,251 A | * | 10/1997 | Credle, Jr. | A63H 33/086 206/501 |
| 5,687,895 A | * | 11/1997 | Allison | B60R 7/02 220/23.4 |
| 5,855,310 A | * | 1/1999 | Van Ert | B60R 11/06 224/275 |
| 6,471,278 B2 | * | 10/2002 | Leitner | B60R 9/00 224/404 |
| 7,159,730 B2 | | 1/2007 | Rumpel | |
| 7,329,451 B2 | * | 2/2008 | Putt | B32B 5/26 296/97.23 |
| 7,537,119 B2 | * | 5/2009 | Becklin | B65D 21/0222 206/508 |
| 2002/0145022 A1 | | 10/2002 | Nguyen et al. | |
| 2003/0010799 A1 | * | 1/2003 | Ashing | B60R 11/02 224/483 |
| 2004/0207225 A1 | * | 10/2004 | Billarant | B60R 11/00 296/39.1 |
| 2009/0212584 A1 | * | 8/2009 | Hill | B60R 7/02 296/37.5 |

\* cited by examiner

LOAD AND LOCK CONTAINERS FOR CARRYING GOODS IN VEHICLES AND ASSOCIATED METHODS

FIELD OF THE INVENTION

The present invention relates to containers that can be used on moving vehicles such as trucks (like pick-up trucks) that have elements on the outside of those containers that allow the containers to be affixed and/or secured to the moving vehicle. In an embodiment, the containers can also be easily removed so that they no longer are affixed and/or secured to the moving vehicle. The inside of the container allows goods to be inserted inside the container so that the goods can be transported without the fear of the container falling over and/or the goods falling out of the container.

BACKGROUND OF THE INVENTION

Trucks for transporting cargo are well known and are widely used in business and for recreation. Some truck owners customize the pick-up truck box to provide convenient interface points for tie downs that are used to secure tools, motorcycles, recreation vehicles, containers, or other cargo. Unfortunately, the interface points often require straps that must be stored in the back of the truck or other location. If and when the straps are lost, the tools and/or containers can no longer be secured to the truck bed.

Other pick-up truck owners may drill holes in the pick-up truck box or use existing holes or other structural features such as edge flanges or the top end of the bed wall to provide interface points for accessories. Drilling holes in a pick-up truck box increases the extent of corrosion, disrupts the integrity and reduces the strength of the structure. Using existing structural features to secure objects to a pick-up truck box may not meet all of a use's needs and requirements.

The use of aluminum to fabricate the sidewalk and floor of a pick-up truck has been proposed to achieve substantial weight savings. In prior art steel bed pick-up trucks it is common for users to drill holes in the sidewalls or bed to establish customized tethering locations. Drilling holes and securing heavy objects to anchors or fasteners to a truck bed having aluminum sidewalk and an aluminum bed may not be effective due to the lower strength of aluminum. Moreover, having the holes in the aluminum may allow the accumulation of water, thereby facilitating rust on steel parts that are adjacent to the aluminum.

This disclosure is directed to addressing the above problems and other problems as summarized below.

BRIEF SUMMARY OF THE INVENTION

The present invention relates to containers that can be used on moving vehicles such as trucks (like pick-up trucks) that have one or more elements on the outside of those containers that allow the containers to be affixed and/or secured to the moving vehicle. In an embodiment, the containers can also be easily removed so that they no longer are affixed and/or secured to the moving vehicle. The inside of the container allows goods to be inserted inside the container so that the goods can be transported without the fear of the container falling over and/or the goods falling out of the container.

DETAILED DESCRIPTION OF THE INVENTION

In one embodiment, the present invention relates to containers/totes that can be used on moving vehicles such as trucks (like pick-up trucks) that have one or more elements on the outside of those containers that allow the containers to be affixed and or secured to the moving vehicle. In an embodiment, the containers can also be easily removed so that they no longer are affixed and/or secured to the moving vehicle. The inside of the container allows goods to be inserted inside the container so that the goods can be transported without the fear of the container falling over and/or the goods falling out of the container.

The containers may contain a top that also prevents the goods from falling out of the containers.

In an embodiment, the present invention relates to a simple method of storing various goods in the back of a vehicle (such as a pick-up truck) wherein the goods are placed into one or more containers/totes that are designed so that they can be secured to the bed of a pick-up truck without the use of straps and/or having to drill holes. In one embodiment, the containers/totes are designed to carry products that may have dimensions that are up to three feet. For example, in one embodiment, the container/tote may be 3'×3'×3' in size (i.e., 27 cubic feet) allowing one to store tools, hand style tank sprayers, groceries or other cargo that may typically be placed in the back of a vehicle (such as a pick-up truck). Alternatively, the container/tote may be 2'×2'×2' in size (i.e., 8 cubic feet) in size or 2'×2'×1 ½' (i.e. 6 cubic feet) or 2'×1 ½'×1 ½' (i.e., 4 ½ cubic feet) or 1 ½"×1 ½'×1 ½' in size (i.e., 3.375 cubic feet) or 1'×1'×1' in size (i.e., 1 cubic feet) or any other size that is reasonable for carrying goods. In one embodiment, the container/tote size is designed so that it fits snugly into the bed of a truck (e.g., the sides of the container/tote abut against the sides of the bed of the pick-up).

Figure 1:
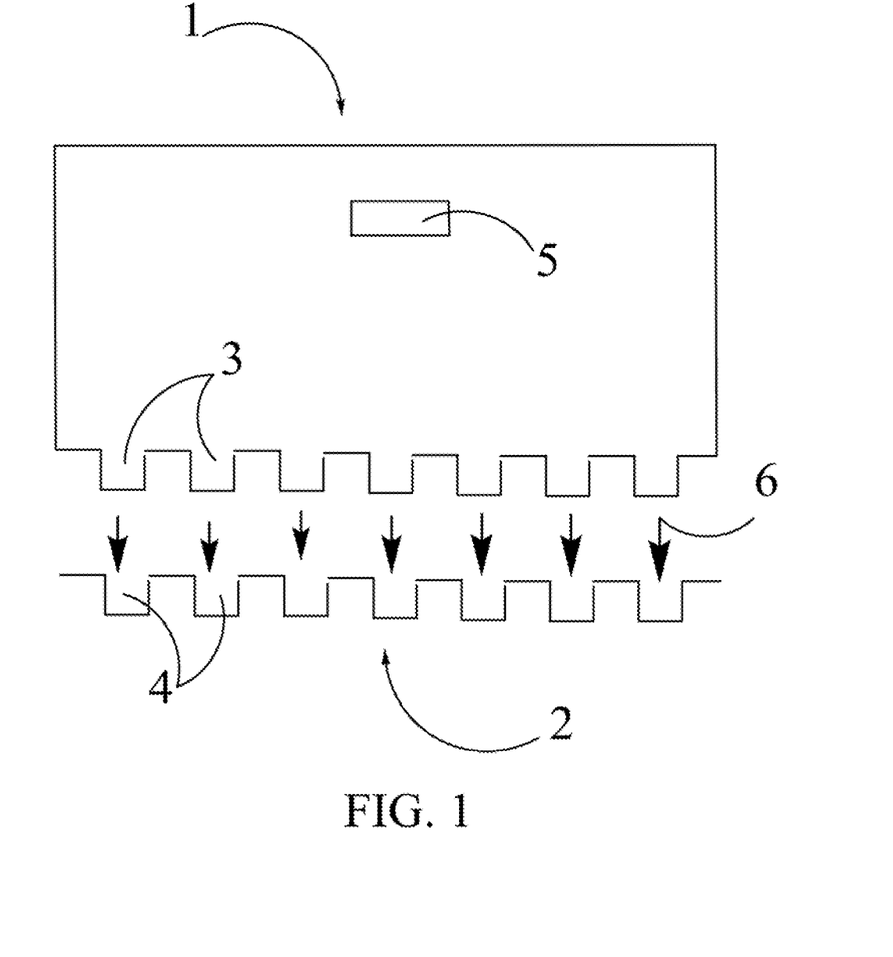
FIG. 1 shows a side view of one embodiment of the invention showing a container and how it can attach to the truck bed.

The container/tote is designed so that it can be easily secured to the vehicle (e.g., the bed of the truck) so that the container/tote does not move when the vehicle is in motion. The method by which the container/tote is secured to the vehicle will be discussed in detail below. In an embodiment, the container/tote may be easily removed after it has been secured and the container/tote can be easily transported out of the back of the truck. In one embodiment, the container/tote may have handles that allow the container/tote to be more easily carried. In an embodiment, the container/tote can be secured to a vehicle by having protrusions on the outside of the container that fit into depressions that are on the base of the truck. Thus, as shown in FIG. 1 one should note that this is a side view of one embodiment of the invention showing a container and how it can attach to the truck bed. The container/tote 1 contains one or more protrusions 3 and one or more handles 5. The protrusions 3 are of a size so that a truck bed 2 containing depressions 4 of the same size can have the protrusions 3 fit into the depressions 4 when one pushes the container/tote 1 in a direction as shown by arrows 6. The protrusions 3 and depressions 4 are ideally the exact same size so that when one secures the container/tote 1 into the truck bed 2, one gets a snap fit type securing of the container/tote 1 on to the truck bed 2 so that the container cannot be easily moved. After the container/tote 1 is secured to the truck bed 2, one can unsecure the container/tote 1 by using the handles 5 to remove the tote/container 1 and applying a force that is opposite arrows 6. It should be understood that although the embodiment as shown in FIG. 1 has the protrusions 3 on the container/tote and depressions 4 on the truck bed 2, one could just as easily have the protrusions on the truck bed and depressions on the container.

Figure 2:
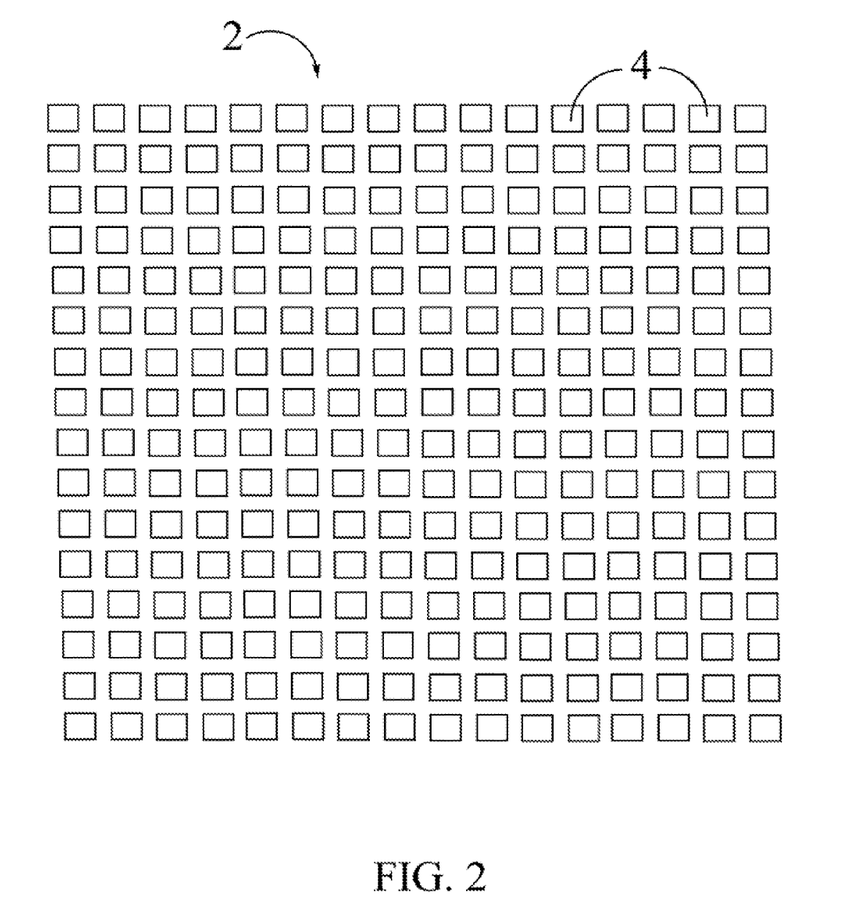
FIG. 2 shows a top view of an embodiment of the invention showing the bed of the truck.

In an embodiment, the bed of the truck 2 can also be seen in FIG. 2, which shows a top down view of the bed of the truck 2. The depressions 4 are square in shape in this embodiment. However, it should be understood that the depressions can be any shape as long as the protrusions on the container/tote are the same corresponding shape. For example, the bottom of depressions can be circles (i.e., when considering the depression depth, the shape is cylindrical), triangles, rhombuses, rectangles, diamond-shaped, pentagonal, hexagonal, heptagonal, octagonal or any other shape. The corresponding top for a horizontal cross sectional area) of the protrusion on the container/tote should be the same shape so that it fits into the depressions in a snap fit manner.

Figure 3:
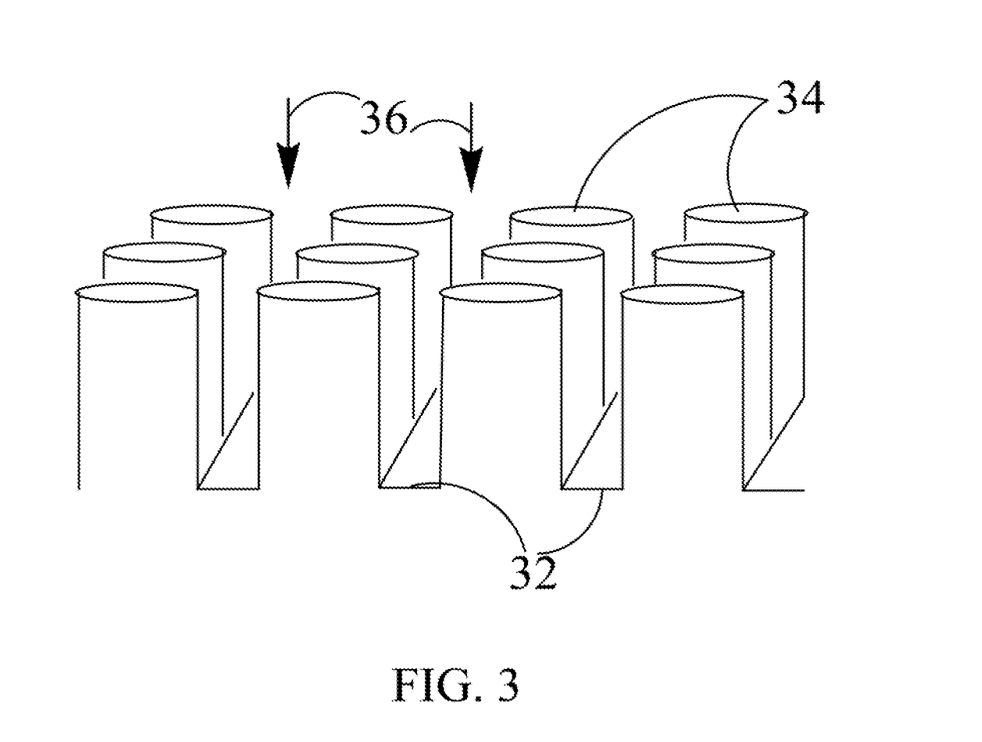
FIG. 3 shows a perspective view of the bed of a truck.

FIG. 3 shows a perspective view of protrusions 34 that arise from the bed of a truck 32. It should be noted that in this embodiment, the bed of the truck 32 contains the protrusions 34 (compare this to FIG. 1 wherein the protrusions are on the container/tote and the depressions are on the truck bed). The container/tote (not shown) has depressions that are designed to have the protrusions 32 fit into the depressions, which are on the outside of the container/tote. By pressing the container/tote on to the bed of the truck 32 in the direction of arrows 36, the protrusions 34 fit into the depressions on the container/tote allowing the container/tote to be secured to the truck bed 32. It should be noted that in FIG. 3, the protrusions 34 are cylindrical in shape but as mentioned above, the shape of the protrusions can be any shape as long as they fit into the depressions so that the container/to can be adequately secured (note that in contrast to the circular protrusions 34 in FIG. 3 that the depressions in FIG. 2 are square in shape).

In an embodiment, there may be protrusions and/or depressions on the sides of the container/tote so that the container/tote can be secured to the sides of, for example, the back bed of the pick-up truck.

Figure 4:
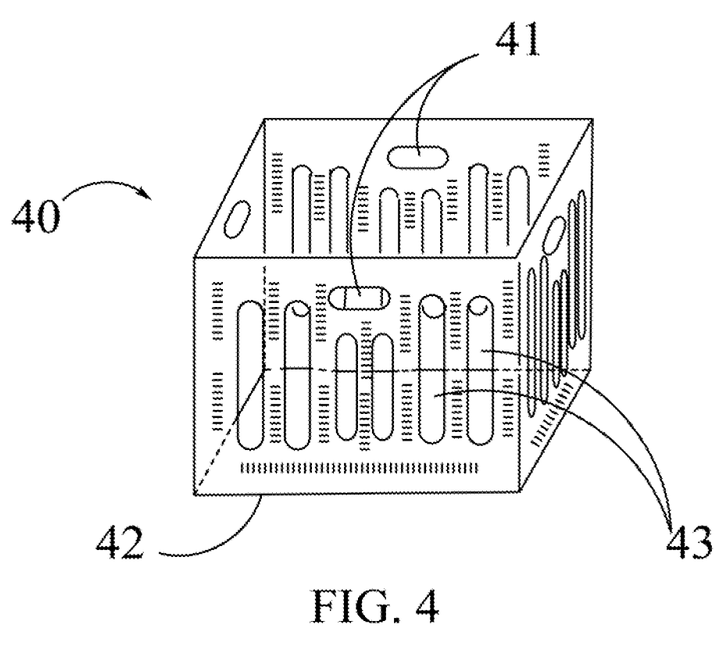
FIG. 4 shows a perspective view of a container/tote.

FIG. 4 shows a perspective view of a container/tote 40 as it relates to the instant invention. In an embodiment, the container/tote may have one or more handles 41 that allow a person to easily lift the container. In one embodiment, the bottom 42 of the container/tote 40 may have either protrusions or depressions on the outside of container/tote (not shown) that allow the container to be secured to the truck. In an embodiment, the container/tote 40 may have one or more openings 43 that allow the person to view the goods that may be contained within the confines of the container/tote 40.

In an embodiment, the container/tote 40 may be made of a hard plastic. Plastics that can be used include one or more of hard plastic such as polymers comprising phenol/formaldehyde polymer, a polyvinylchloride polymer, a polycarbonate polymer, a butadiene styrene copolymer, a polycarbonate butadiene styrene copolymer, a polyetherether ketone polymer, a polyarylether ketone polymer, a clay nanosheet-containing water soluble polymer and/or mixtures thereof.

Although hard plastic tends to be the cheapest and the easiest to replace, it should be understood that other materials such as hard rubbers or metals could be used in the containers/totes of the present invention including mixtures of materials. For example, in one embodiment, the containers/totes further comprise one or more materials selected from rubber and/or metal. Thus, any part can be changed and/or reconfigured by substitution of other materials.

Similarly, the bed of the vehicle to which the container/tote is to be secured can be made of one or more hard plastics such as polymers comprising phenol/formaldehyde polymer, a polyvinylchloride polymer, a polycarbonate polymer, a butadiene styrene copolymer, a polycarbonate butadiene styrene copolymer, a polyetherether ketone polymer, a polyarylether ketone polymer, a clay nanosheet-containing water soluble polymer and/or mixtures thereof.

Likewise the bed of the vehicle (e.g. truck) can also be made of metal, wood, and/or a hard rubber or combinations thereof.

It should be understood that although the device(s) and methods are described with respect to being used in a pick-up truck, it is contemplated and therefore within the scope of the invention that the devices methods could be used in the trunk of an automobile/car. Alternatively, the device methods can be used on motorcycles, scooters, all-terrain vehicles, dune buggies or other vehicles where one may have interest in transporting goods in containers/totes that are to be secured to a vehicle.

In an embodiment, it is contemplated and therefore within the scope of the invention that the containers/totes may be secured to an intermediate layer, which in turn may be secured to the vehicle. For example, the container/tote, which has depressions, may be secured to a mat that has protrusions on one side of the mat. On the other side of the mat there might be a means of adhering the mat to, for example, the bed of the pick-up truck. In one embodiment, the other side of the mat may contain hook and loop (VELCRO) that can be adhered to hook and loop on the bed of a truck. It should be recognized that the protrusions on one side of the mat will snap securely into the depressions on the outside of the container/tote.

Figure 5:
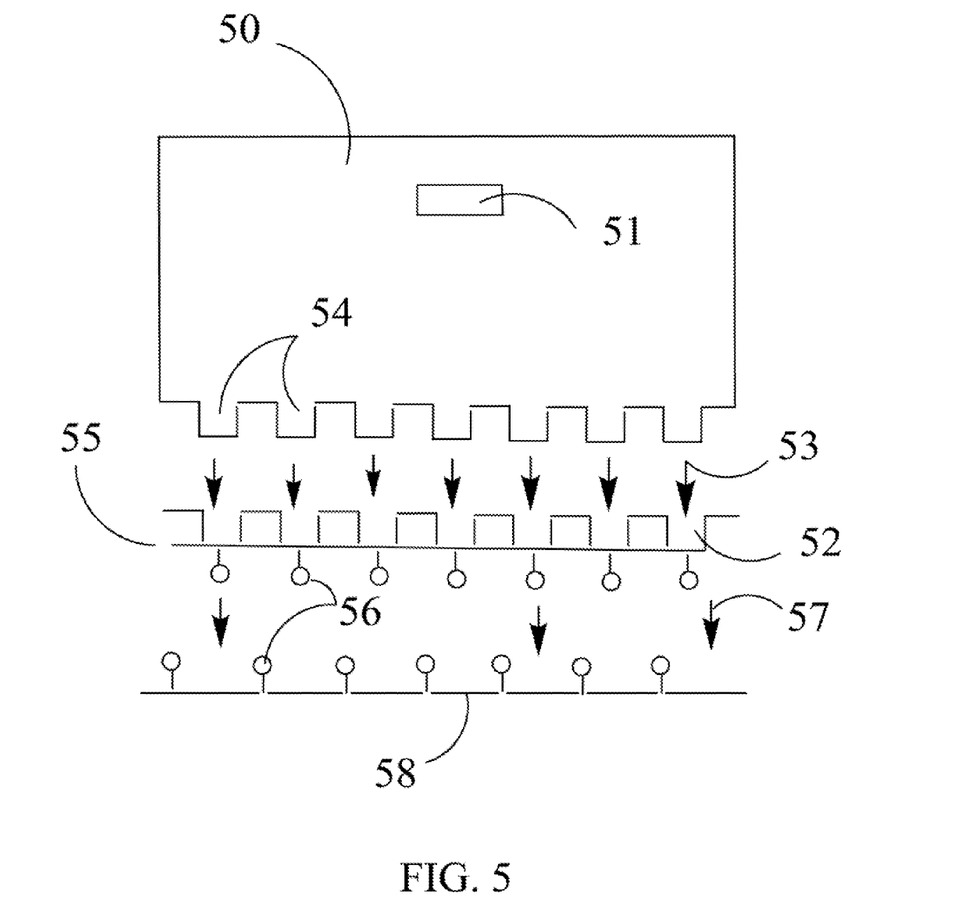
FIG. 5 shows a side view of a container/tote, with a mat, and the surface of a vehicle.

In an embodiment, FIG. 5 shows an embodiment with an intermediary layer 55. The container/tote 50 may have one or more handles 51 that allow a person to pick up or depress the container in a direction of arrows 53 on to an intermediate layer 55. The container/tote 50 may have one or more protrusions 54 that are designed to fit into one or more depressions 52 on a first side of the intermediary layer 55 (such as a mat). On the second side of the intermediary layer 55, the intermediary layer may have hook and loop 56 (VELCRO) that allows the hook and loop to adhere to hook and loop 56 in the direction of arrows 57 on the surface of a vehicle 58. In an embodiment, the intermediary layer 55 may be designed to fit onto any of a plurality of surfaces of a vehicle. For example, on a motorcycle seat, one may have hook and loop (VELCRO) towards the back end of a seat that allows a mat 55 to adhere to the back of the motorcycle seat. The container 50 and then be snapped into place on to the mat, which has protrusions and/or depressions that are designed to accommodate depressions and/or protrusions on the container/tote.

In one embodiment of the present invention, the container/tote may have both depressions and protrusions and the intermediary layer may have the corresponding but opposite number of protrusions and depressions to accommodate the container/tote. Similarly, if an intermediary layer is not present, the surface of a vehicle (e.g., the bed of a truck) may have the corresponding but opposite number of protrusions and depressions to accommodate the container/tote.

In one embodiment, the container/tote may optionally have a cover or lid that snap fits onto the container/tote, the outside of the cover or lid optionally comprising protrusions and/or depressions that can accommodate depressions and/or protrusions on the bottom of a second container/tote. In this embodiment, a first container/tote may sit below a second container/tote. The first container/tote is secured to the surface of a vehicle and the second container/tote sits atop to and is secured to the first container/tote. It should be understood that a plurality of containers/totes can be secured to each other, one above the next. In an embodiment, the top rim (i.e., the outer circumference) of the container/tote may have depressions and/or protrusions. Accordingly, in this embodiment a cover or lid is not required for a second container/tote to sit atop and be secured to a first container tote that is below the second/container tote, with the first container/tote being secured to the bottom of a vehicle.

In an embodiment, the present invention relates to a container/tote that comprises one or more depressions or protrusions on a bottom of the container/tote, said container/tote being designed to correspondingly accommodate and fit into one or more protrusions or depressions on a surface of a vehicle thereby securing the container/tote to the vehicle.

In a variation, the container/tote further comprises one or more handles. The container tote may be made of a hard plastic. The hard plastic may be a polymer selected from the group consisting of a phenol/formaldehyde polymer, a polyvinylchloride polymer, a polycarbonate polymer, a butadiene styrene copolymer, a polycarbonate butadiene styrene copolymer, a polyetherether ketone polymer, a polyarylether ketone polymer, and a clay nanosheet-containing water soluble polymer or mixtures thereof.

In a variation, at least one outside side of the container/tote may also comprise protrusions or depressions designed to correspondingly accommodate and fit into one or more protrusions or depressions on a vertical surface of a vehicle. Accordingly, the container/tote can be secured to the side of the vehicle (such as the vertical part of the cab of a pick-up truck, or the sides of the bed of the pick-up truck).

In a variation, the shape of the very top (or a horizontal cross section) of the one or more protrusions may be a circle, a square, a rhombus, a rectangle, a triangle or a polygon. In one variation, the bottom of the depression (or a horizontal cross section of the depression) should have the same corresponding shape designed to accommodate the protrusion. For example, if the top of one protrusion is circular, the bottom of a corresponding depression is also circular, the two being the same size so that the protrusion snap fits into the depression. In a variation, all of the protrusions are designed to snap fit into all of the depressions.

In an embodiment, the present invention relates to systems. In one embodiment, the system comprises a container/tote and a surface of a vehicle, the container tote comprising one or more depressions and/or protrusions on a bottom of the container/tote, the container/tote being designed to correspondingly accommodate and fit into one or more protrusions and/or depressions on the surface of a vehicle thereby securing the container/tote to the surface of the vehicle.

In one variation, the container/tote and the surface of the vehicle are both comprised of a hard plastic. In a variation, the container/tote may further comprise one or more handles. In one variation, the one or more handles allow a person to pick-up and depress the container/tote onto the surface of the vehicle. In a variation, each depression has a corresponding and opposite protrusion, each protrusion designed to fit exactly into each depression.

In an embodiment, the hard plastic in the system may be a polymer selected from the group consisting of a phenol/formaldehyde polymer, a polyvinylchloride polymer, a polycarbonate polymer, a butadiene styrene copolymer, a polycarbonate butadiene styrene copolymer, a polyetherether ketone polymer, a polyarylether ketone polymer, and a clay nanosheet-containing water soluble polymer or mixtures thereof.

In an embodiment, the present invention relates to a system comprising a container/tote, an intermediary layer, and a surface of a vehicle, said container/tote comprising one or more depressions and/or protrusions on a bottom of said container/tote, said intermediary layer comprising two sides, a top side and a bottom side, said top side comprising one or more protrusions or depressions, the one or more protrusions and/or depression on the top side of the intermediary layer designed to accommodate the one or more depressions and/or protrusions on the bottom of the container/tote allowing the container/tote to be secured to the top of the intermediary layer, the bottom side of the intermediary layer comprising hook and loop, which is designed to adhere to hook and loop on the surface of the vehicle.

In the system, the container/tote may be comprised of a hard plastic and optionally may comprise one or more handles In a variation, the hard plastic may be a polymer selected from the group consisting of a phenol/formaldehyde polymer, a polyvinylchloride polymer, a polycarbonate polymer, a butadiene styrene copolymer, a polycarbonate butadiene styrene copolymer, a polyetherether ketone polymer, a polyarylether ketone polymer, and a clay nanosheet-containing water soluble polymer or mixtures thereof.

In an embodiment, the system may further comprise a cover or lid that is designed to snap fit onto a top of a first container/tote. In one variation, the top of the cover or lid further comprises depressions and/or protrusions designed to accommodate and secure a second container/tote that sits atop the first container/tote. In an embodiment, the intermediary layer may be flexible. By flexible, it is meant that the intermediary layer has some give to it so that it can be bent to a small degree. However, it is not so flexible as to lose its strength so that it is unable to accommodate and snap fit into, for example, the bottom of a container/tote. In one variation, the intermediary layer is a mat.

In an embodiment, the present invention also relates to methods. In one embodiment, the method relates to a method of carrying goods, wherein the goods fit into a container/tote, said container/tote being able to be secured to the surface of a vehicle or the top of an intermediary layer by protrusions and/or depressions that fit into opposite but corresponding depressions and/or protrusions. If an intermediary layer is present, the intermediary layer may have hook and loop on the bottom that is designed to adhere to hook and loop on the surface of a vehicle. In a variation, the method relates to a method of affixing a container/tote to a surface of a vehicle, either directly or indirectly through an intermediary layer.

It is contemplated and therefore within the scope of the invention that any feature that is discussed above can be combined with any other feature to make the devices, apparatuses, systems, and methods of the present invention, even if they are not discussed together. In any event, the invention is defined by the below claims. It should be apparent that minor modifications can be made to the present invention without departing from the spirit and scope of the invention.

The invention claimed is:

1. A system comprising a container/tote and a surface of a vehicle, said container/tote comprising more than one depressions and/or protrusions on a bottom of the container/tote, said container/tote being designed to correspondingly accommodate and fit into more than one protrusions and/or depressions on the surface of a vehicle thereby securing the container/tote to the surface of the vehicle wherein the container/tote and the surface of the vehicle are both comprised of a hard plastic and wherein the hard plastic is a polymer selected from the group consisting of a phenol/formaldehyde polymer, a polyvinylchloride polymer, a polycarbonate polymer, a butadiene styrene copolymer, a polycarbonate butadiene styrene copolymer, a polyetherether ketone polymer, a polyarylether ketone polymer, and a clay nanosheet-containing water soluble polymer or mixtures thereof wherein the container/tote further comprises one or more openings in the container/tote, wherein the one or more openings allow a person to view goods that are contained within the container/tote, the system further comprising a cover that is designed to snap fit onto a top of the container/tote and a second container/tote sitting atop the container/tote, wherein a top of the cover further comprises depressions and/or protrusions accommodating and securing the second container/tote atop the first container/tote.

2. The system of claim 1, wherein the container/tote further comprises one or more handles.

3. The system of claim 2, wherein the one or more handles allow a person to pick-up and depress the container/tote onto the surface of the vehicle.

4. The system of claim 3, wherein each depression has a corresponding and opposite protrusion, each protrusion designed to fit exactly into each depression.

5. A system comprising a container/tote, an intermediary layer, and a surface of a vehicle, said container/tote comprising more than one depressions and/or protrusions on a bottom of said container/tote, said intermediary layer comprising two sides, a top side and a bottom side, said top side comprising more than one protrusions and/or depressions, the more than one protrusions and/or depressions on the top side of the intermediary layer designed to accommodate the more than one depressions and/or protrusions on the bottom of the container/tote allowing the container/tote to be secured to the top of the intermediary layer, the bottom side of the intermediary layer comprising hook and loop, which is designed to adhere to hook and loop on the surface of the vehicle wherein the container/tote further comprises one or more openings in the container/tote, wherein the one or more openings allow a person to view goods that are contained within the container/tote, wherein said container/tote is a polymer selected from the group consisting of a phenol/formaldehyde polymer, a polyvinylchloride polymer, a polycarbonate polymer, a butadiene styrene copolymer, a polycarbonate butadiene styrene copolymer, a polyetherether ketone polymer, a polyarylether ketone polymer, and a clay nanosheet-containing water soluble polymer or mixtures thereof, the system further comprising a cover that is designed to snap fit onto a top of said container/tote.

6. The system of claim 5, wherein the container/tote further comprises one or more handles.

7. The system of claim 5, wherein a top of the cover further comprises depressions and/or protrusions designed to accommodate and secure a second container/tote that sits atop the container/tote.

8. The system of claim 5, wherein the intermediary layer is flexible.

* * * * *